United States Patent [19]
Park

[11] Patent Number: 5,825,737
[45] Date of Patent: Oct. 20, 1998

[54] OPTICAL DISK PLAYER HAVING AN APPARATUS FOR ACCURATELY LOADING/ UNLOADING A DISK

[75] Inventor: Jun-Hyun Park, Seoul, Rep. of Korea

[73] Assignee: Daewoo Electronics Co., Ltd., Seoul, Rep. of Korea

[21] Appl. No.: 578,895

[22] Filed: Dec. 27, 1995

[30] Foreign Application Priority Data

Dec. 30, 1994 [KR] Rep. of Korea .................. 1994-39369

[51] Int. Cl.⁶ ............................................... G11B 17/04
[52] U.S. Cl. ............................................................ 369/77.1
[58] Field of Search .............................. 369/36, 37, 75.1, 369/77.1, 178, 192; 360/92

[56] References Cited

U.S. PATENT DOCUMENTS 5,119,357  6/1992  Tsuruta et al. ......................... 369/77.1
5,187,695  2/1993  Schindler et al. ......................... 369/37

*Primary Examiner*—Robert S. Tupper
*Assistant Examiner*—George J. Letscher
*Attorney, Agent, or Firm*—Beveridge, DeGrandi, Weilacher & Young LLP

[57] ABSTRACT

An optical pickup device for guiding a disk to a predetermined position while setting the disk exactly has a tray having arc-shaped guiding slots at a predetermined position on the tray. A disk supporting member is fixed at the bottom of the tray for being spread left and right during the forward transfer of the tray, and for being converged internally during the backward transfer of the tray. A loading device is fixedly installed at the bottom of the tray for supplying power to transfer the tray forward and backward and for supplying power for the disk supporting member to be spread or supported depending on the forward or backward transfer of the tray. A player main body has a rack gear on a surface adjacent to the tray during transfer of the tray. Therefore, any device disorder due to an erroneous insertion is prevented.

6 Claims, 5 Drawing Sheets

OPTICAL DISK PLAYER HAVING AN APPARATUS FOR ACCURATELY LOADING/ UNLOADING A DISK

BACKGROUND OF THE INVENTION

1. Field of the Invention

The present invention relates to an optical disk player, and more particularly, to an optical disk player adopting a front loading method by which a disk is automatically supported and its exact position is automatically determined when a tray, on which a disk is mounted, is inserted into the disk player.

2. Description of the Prior Art

An optical disk player performs recording and/or reproduction onto an optically recordable disk. There are several methods for loading and/or unloading a disk to/from such an optical disk player. Among them, as disclosed in U.S. Pat. Nos. 4,862,445 (issued to Sasaki) and 5,434,839 (issued to Choi), a disk loading apparatus adopting a front loading method by which a tray on which a disk is mounted moves horizontally toward inside the player and then the disk is loaded on a turntable vertically, is widely used.

FIG. 1 is a perspective view of a conventional optical disk player adopting the front loading method in a state where the tray is ejected.

A tray 20 is transferred from a player main body 18 to the front to receive a disk and then is transferred into player main body 18 to load the disk on a turntable, as shown in FIG. 1. A disk mounting portion 12 for selectively mounting optical disks having different sizes is formed on the front upper surface of tray 20, which is stepped with respect to the upper surface of tray 20. A turntable guiding hole 14 is formed in the center of disk mounting portion 12. A pickup guiding hole 16 is formed to the rear of turntable guiding hole 14.

A rack gear is integrally formed lengthwise in one side of the lower surface of tray 20 to be meshed with a transporting pinion which is a constituting element of a loading apparatus installed on a base plate disposed inside player main body 18 so that tray 20 is loaded or unloaded backward and forward.

FIG. 2 is a front sectional view of a tray transfer device in the above-described optical disk player. The operation of the respective parts will be described with reference to FIG. 2.

A transporting motor 13 driven forward or backward according to applied signals is placed in a predetermined position of base plate 10. A decelerating gear group 15 for decelerating the rotation number of transporting motor 13 to an appropriate number is mechanically coupled to transporting motor 13. A transporting pinion 19 is installed on a rotary shaft 17 meshed with a gear which is an element constituting decelerating gear group 15 and rotated with the decreased rotation number in the original place. In one side of the lower surface of tray 20 upwardly coupled to base plate 10, a rack gear 22 which linearly moves forward and backward during rotation of transporting pinion 19, and is meshed with transporting pinion 19, is formed lengthwise.

Guiding ribs 26 are formed from the front to the rear side of the player at the predetermined height of the internal surface of both side walls 24a and 24b of base plate 10, and guiding grooves 28 are formed at both sides of the corresponding tray 20 so that guiding ribs 26 are inserted into guiding grooves 28 and base plate 10 and tray 20 are coupled with each other.

Finally, as transporting motor 13 rotates, transporting pinion 19 coupled with the transporting motor, rotates at its original place. Subsequently, as rack gear 22 meshed with transporting pinion 19 and integrally formed at the side of tray 20 is transferred forward and backward, tray 20 is transferred forward and backward, thereby allowing for the loading or unloading of a disk.

There have been reported various applicable technologies for stabilizing and facilitating the loading or unloading of a tray in the above-described manner to extract or change a disk.

U.S. Pat. No. 4,862,445 issued to Sasaki discloses a simplified disk loading mechanism for a disk player, in which the loading and unloading of a disk tray is simplified through combining separate horizontal and vertical operations. According to this disclosure, when the disk tray is drawn out, the disk tray becomes downwardly slanted with respect to the disk player. Therefore, the disk can be easily loaded and advantageously extracted from the disk tray.

Also, U.S. Pat. No. 5,218,593 issued to Kaneo et al. discloses a loading device of an optical disk player wherein the tray operations at the starting point and the arrival point are slowed down through an introduction of a simplified structure, thereby improving the quality of the loading operation.

However, in tray 20 of the aforementioned optical disk player, the mounting position of a disk is determined in advance. Thus, if an external shock is applied when tray 20 is loaded inside player main body 18 in a state where the disk is placed on disk mounting portion 12 of tray 20 while exchanging a disk, then the disk may deviate from its proper loading position. Also, tray 20 may be drawn in a state where a user erroneously places the disk. Accordingly, a disorder or a malfunction of the device may be generated due to an erroneous insertion of a disk.

SUMMARY OF THE INVENTION

To solve the problems of the conventional art, it is an object of the present invention to provide a novel optical disk player that automatically determines whether a disk is safely positioned while a tray enters into the inside of a player main body and that supports the disk so that the disk will not fluctuate forward or backward, or left or right, when the disk is installed onto the tray and the tray is drawn in.

To accomplish the above object, there is provided an optical disk player comprising: a tray having arc-shaped guiding slots at a predetermined position on the tray; a disk supporting means fixed at the bottom of the tray which is to be spread left and right during a forward transfer of the tray and is to be converged internally during a backward transfer of the tray; a loading means fixedly installed at the bottom of the tray for supplying power needed to transfer the tray forward and backward and for supplying power needed for the disk supporting means to be spread or supported depending on the forward and backward transfer of the tray; and a player main body having a rack gear on a surface adjacent to the tray during transfer of the tray.

It is preferable that the loading means is fixed on a bracket and the bracket is fixed at the bottom of the tray.

The loading means includes a transporting gear meshed with the rack gear formed on the player main body, a loading motor for supplying power to the transporting gear, and a transmission gear or belt as a transmission means for transmitting power from the loading motor to the transporting gear.

Also, the loading means includes a transmission gear or belt as a transmission means for transmitting power from the loading motor to the disk supporting means and a supporting link operating means for controlling the spreading and supporting operation of the disk supporting means.

The supporting link operating means includes a supporting link operating pulley, a wire inserting boss integrally formed thereon, and a wire inserted into the wire inserting boss. Both ends of the wire is connected to the disk supporting means so that the loading means and the supporting link operating means are wire-coupled.

Specifically, the disk supporting means includes a disk supporting member including arc-shaped disk guiding portions having a curvature radius larger than that of the disk and is provided with protrusively formed protrusions on a surface of the disk guiding portions to be inserted into the guiding slots and operating portions that extend from the rear part of the disk guiding portion and then bent at a predetermined angle, the disk guiding portions and operating portions being cross-coupled. Also, a torsion spring is provided inside the operating portion of the disk supporting means.

The optical disk player according to the present invention is manufactured by installing a loading device and a supporting device onto a tray itself. This optical disk player supports a disk and exactly determines a disk's position while the tray enters into the player main body. Accordingly, any device disorder which is due to erroneous insertion of the disk can be prevented.

BRIEF DESCRIPTION OF THE DRAWINGS

The above object and advantages of the present invention will become more apparent by describing in detail a preferred embodiment thereof with reference to the attached drawings, in which.

DETAILED DESCRIPTION OF THE INVENTION

Hereinafter, the constituting elements and the operation principle of the optical disk player according to one embodiment of the present invention will be explained in more detail with reference to the accompanying drawings.

Figure 1:
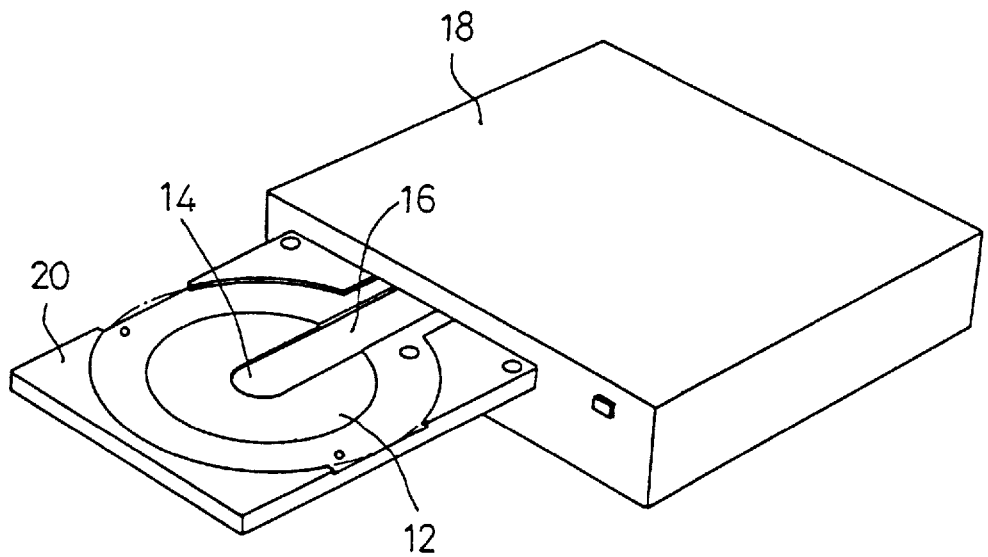
FIG. 1 is a perspective view of a conventional optical disk player in a state where a tray is ejected.
Figure 2:
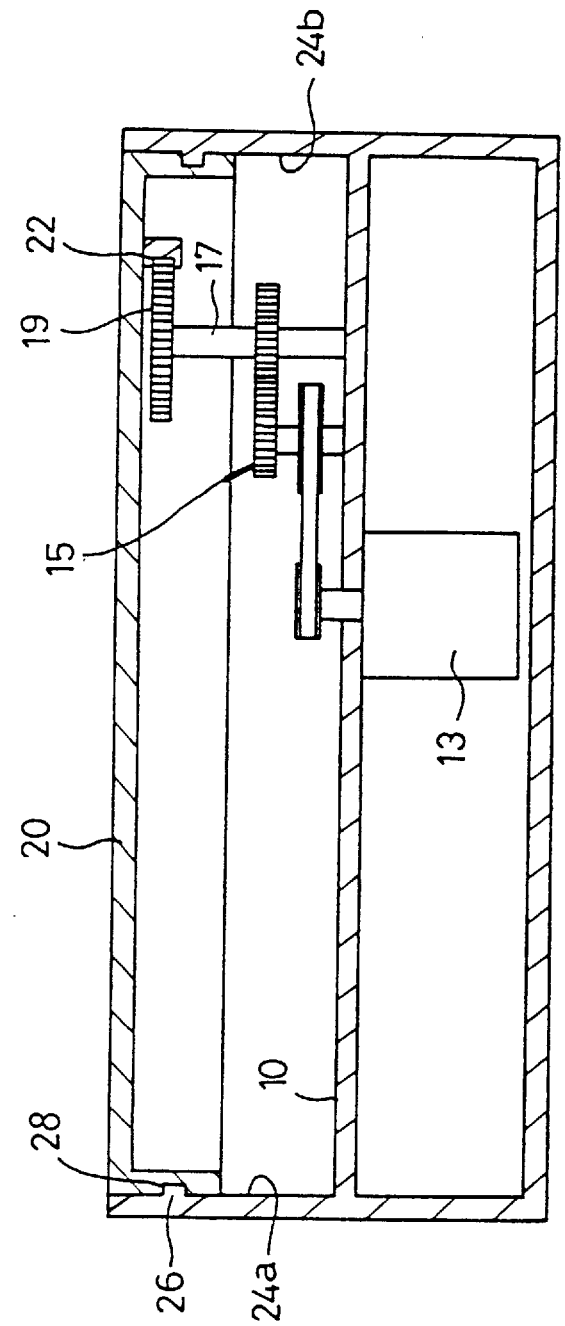
FIG. 2 is a front sectional view of the tray transfer device of a conventional optical disk player.
Figure 3:
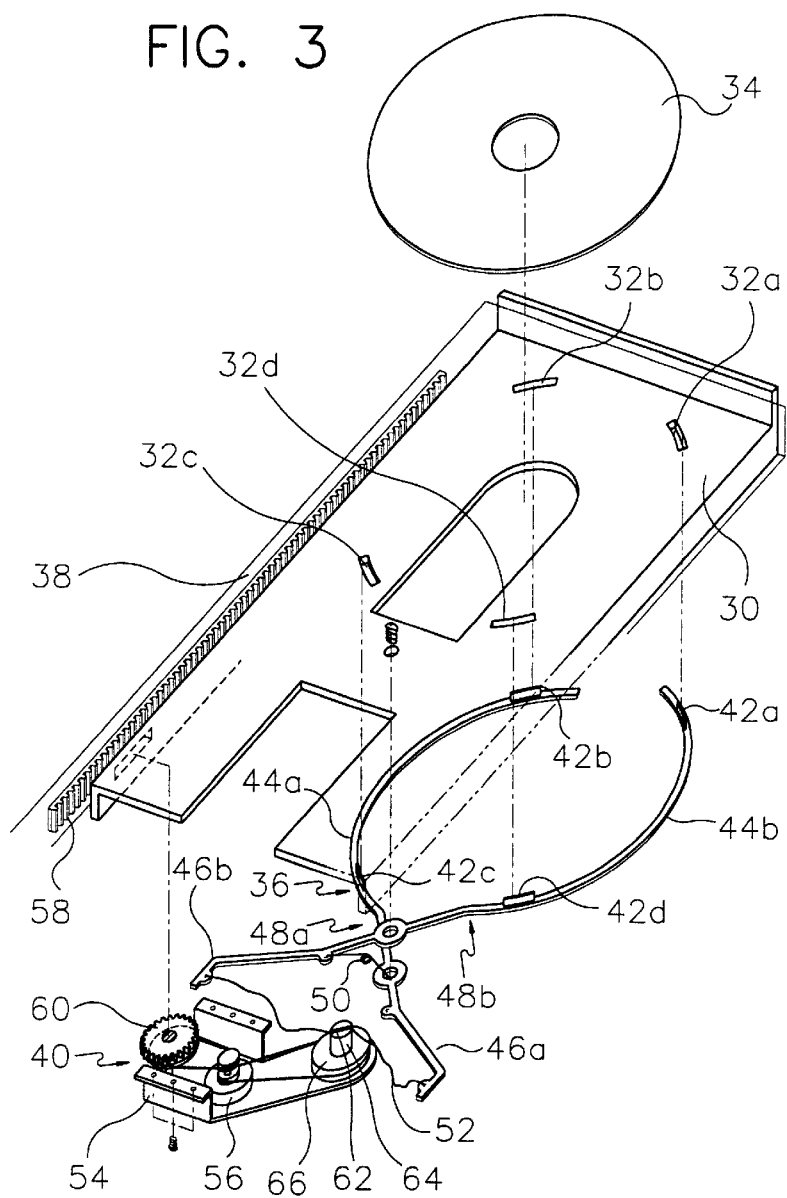
FIG. 3 is an exploded perspective view of a tray transfer device in an optical disk player according to the present invention.
Figure 4:
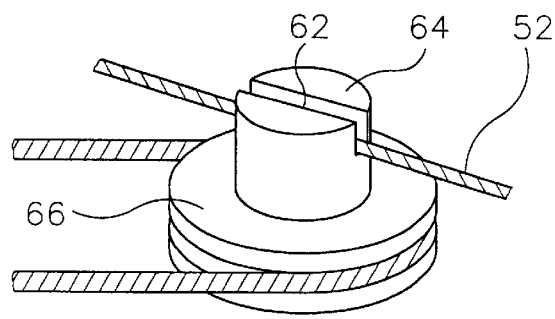
FIG. 4 is an enlarged perspective view showing the essential parts of the tray transfer device in an optical disk player according to the present invention.

FIGS. 3 and 4 are an exploded perspective view and an enlarged perspective view showing the essential parts of a tray transfer device in an optical disk player according to the present invention.

A tray 30 is constructed plainly and arc-shaped guiding slots 32a, 32b, 32c and 32d having a predetermined curvature radius are formed thereon at each position where the central angle of a potential-disk-mounted portion is divided by 90°. At the bottom of tray 30 is installed a disk supporting member 36 for supporting a disk 34 placed on tray 30 in order to prevent fluctuation of the disk. The disk supporting member 36 is spread left and right within the range of guiding slots 32a, 32b, 32c and 32d during the forward transfer of tray 30 and is gathered together toward the center within the range of guiding slots 32a, 32b, 32c and 32d during the backward transfer of tray 30.

At the rear bottom of tray 30, a loading device 40 for supplying power needed for transferring a tray 30 forward or backward with respect to a player main body 38 and power needed for spreading and narrowly supporting operation of disk supporting member 36, is installed in a fixed position.

Disk supporting member 36 is constituted by a pair of supporting links 48a and 48b. The front part of supporting links 48a and 48b formed in an arc shape with a curvature radius slightly larger than that of disk 34 includes disk guiding portions 44a and 44b integrally formed with arc-shaped protrusions 42a, 42b, 42c and 42d inserted into respective guiding slots 32a, 32b, 32c and 32d disposed on tray 30 at each position where the central angle is divided by 90°. The rear part of supporting links 48a and 48b includes operating portions 46a and 46b which extend from the rear end of disk guiding portions 44a and 44b and are bent at a predetermined angle.

A pair of supporting links 48a and 48b are cross-coupled to each other at the center of the rear bottom of tray 30, and are screw-coupled by screw holes formed in the connection between disk guiding portions 44a and 44b and operating portions 46a and 46b.

A torsion spring 50 is installed between operating portions 46a and 46b of respective supporting links 48a and 48b. Torsion spring 50 allows the respective operating portions 46a and 46b and disk guiding portions 44a and 44b to be spread outward, and torsion spring 50 is connected to operating portions 46a and 46b by holes formed thereon.

Holes are formed at the rear parts of the respective operating portions 46a and 46b onto which is connected a tugging wire 52 for converging disk guiding portions 44a and 44b constituting supporting links 48a and 48b toward the center by being drawn during backward transfer of tray 30.

Loading device 40 installed in one side of the rear bottom of tray 30 by a bracket 54 includes a loading motor 56 and a transporting gear 60 which is rotatably installed on bracket 54 for receiving the power to rotate from loading motor 56, is meshed with a rack gear 58 formed at one side of player main body 38 and has an external part that is protruded outwardly to the side of tray 30.

At the other end of bracket 54, a supporting link operating pulley 66 which is rotatable at its original position by the power from loading motor 56 is formed. A tugging wire inserting boss 64, having a cutted groove 62 formed upwardly is integrally protruded in the center of supporting link operating pulley 66. As shown in FIG. 4, tugging wire 52 is inserted into cutted groove 62.

In the optical disk player according to the present invention having the aforementioned configuration, the disk loading and unloading operations will now be described in detail with reference to FIGS. 5 and 6.

Figure 5:
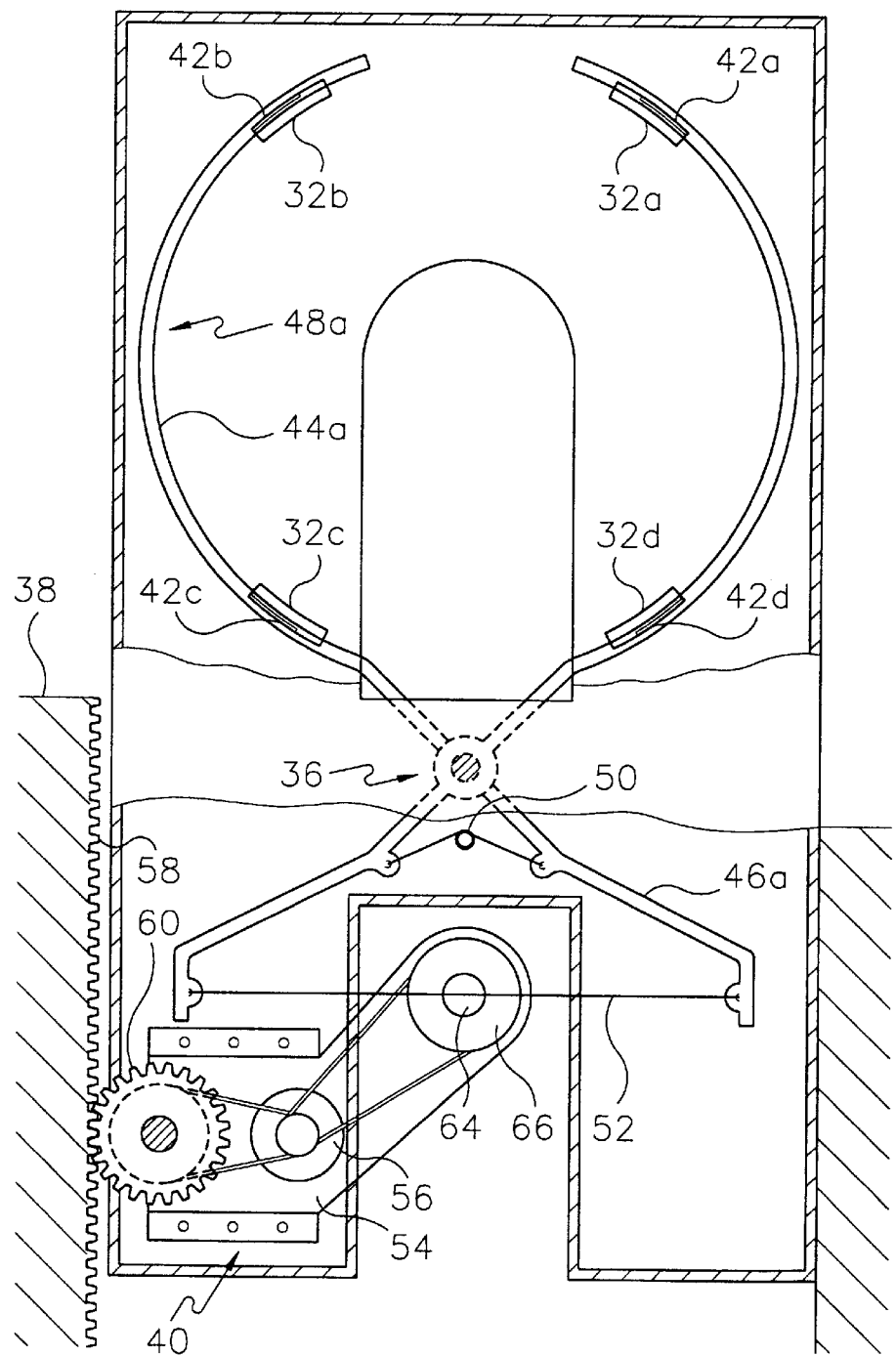
FIG. 5 is a partial sectional view showing the assembled state of the tray illustrated in FIG. 3, when the tray is ejected.
Figure 6:
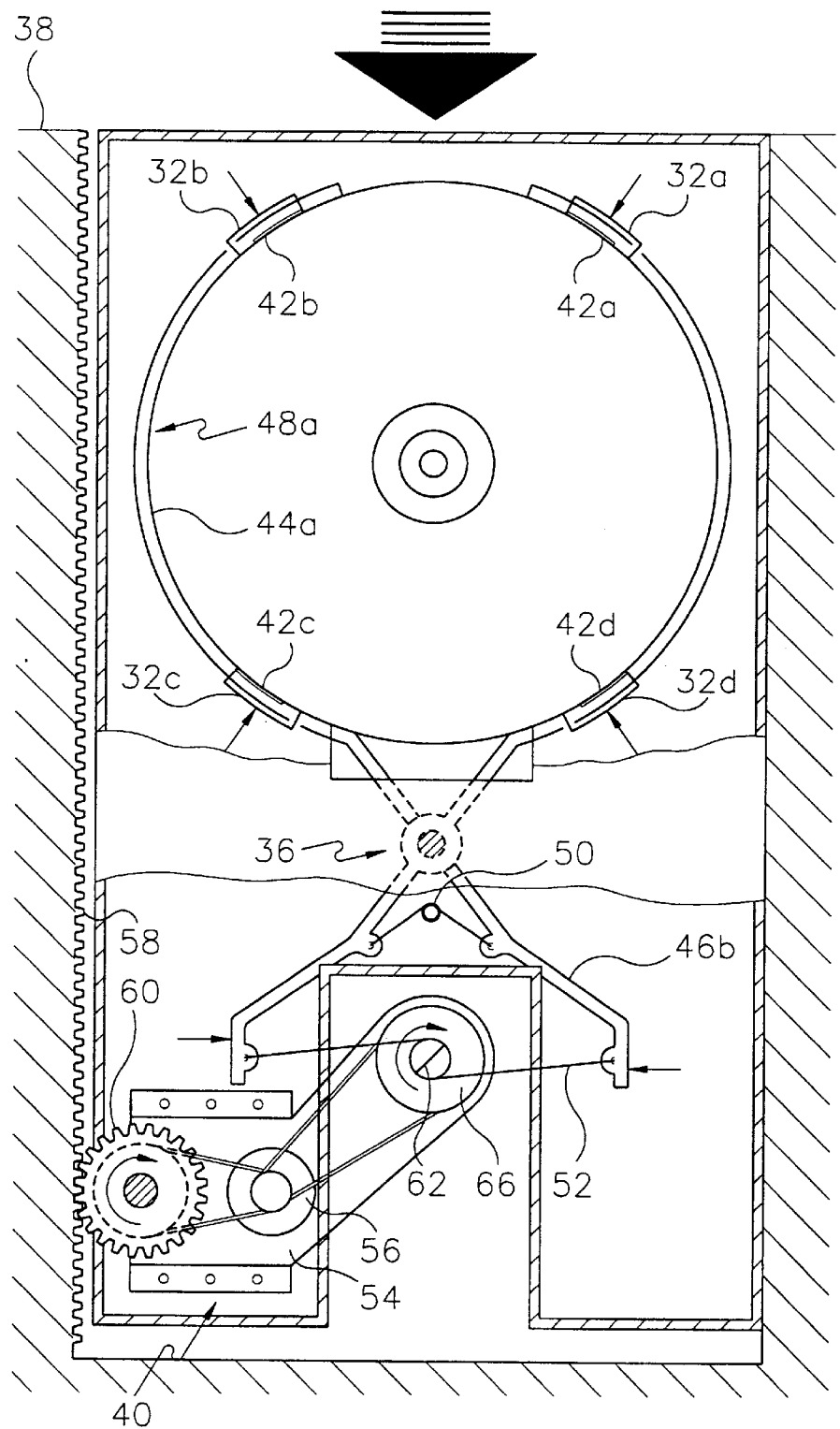
FIG. 6 is a partial sectional view showing a state where the disk is mounted and loaded onto the tray in an optical disk player according to the present invention.

FIG. 5 shows the state when the respective constituents illustrated in FIG. 3 are assembled and the tray is completely ejected, and FIG. 6 shows a state when the disk is mounted onto the tray and then the tray is drawn in.

In other words, FIG. 5 shows a state when tray 30 is transferred to the front of player main body 38. Loading device 40 is fixed at the bottom of tray 30 by bracket 54, and transporting gear 60 is meshed with rack gear 58 formed at one side of player main body 38. Also, in a state where tugging wire 52 is tugged tightly, it is insertedly coupled to the holes formed on operating portions 46a and 46b of supporting links 48a and 48b and is linearly inserted into cutted groove 62 formed on tugging wire inserting boss 64 of supporting link operating pulley 66. Torsion spring 50 fixed on the holes formed on operating portions 46a and 46b diverges to the maximum limit. Protrusions 42a, 42b, 42c and 42d formed on disk guiding portions 44a and 44b are inserted into the corresponding guiding slots 32a, 32b, 32c and 32d, respectively, which are spread outwardly to the maximum limit.

In such a state as shown in FIG. 5, if a user places a disk near the center of tray 30 and then presses a tray shutting switch, loading motor 56 rotates in a predetermined direction. Accordingly, transporting gear 60 also rotates in a predetermined direction (clockwise in FIG. 6) and then is meshed with rack gear 58 formed in one side wall of player main body 38 and the tray is transferred backward.

At the same time as the backward transfer of tray 30, supporting link operating pulley 66 which is installed opposite to transporting gear 60 also rotates by the driving power of loading motor 56. Accordingly, tugging wire inserting boss 64, which protrudes from supporting link operating pulley 66 rotates in the same direction. Tugging wire 52 inserted into cutted groove 62 overcomes the elasticity of torsion spring 50, and the tray is drawn toward the center. Then, the operating portions 46a and 46b in the rear part of supporting links 48a and 48b converge internally, and disk guiding portions 44a and 44b in the front part thereof converge centrally.

Finally, as shown in FIG. 6, tray 30 is completely received into player main body 38 and simultaneously protrusions 42a, 42b, 42c and 42d respectively inserted into guiding slots 32a, 32b, 32c and 32d disposed on tray 30 are supported internally, so that disk 34 is guided to a predetermined position, thereby realizing an exact position determination.

Guiding slots 32a, 32b, 32c and 32d must be larger than protrusions 42a, 42b, 42c and 42d so that they are easily inserted thereto. Their sizes can be adjusted properly but there is no special limit to their sizes. Also, the widths of guiding slots 32a, 32b, 32c and 32d can be adjusted in consideration to the disk receiving space.

In such a state as shown in FIG. 6, in order to eject tray 30 and to extract disk 34 again after performing a reproducing operation, a tray opening switch is pressed. Then, loading motor 56 and transporting gear 60 rotate in the opposite direction of the direction for shutting the tray, that is, counterclockwise, and tray 30 is ejected forward. Simultaneously, supporting link operating pulley 66 also rotates in the opposite direction to release tugging wire 52. Then, disk supporting member 38 is gradually released from the state where it supports disk 34 disposed on tray 30 and is spread to its maximum limit at the completion time of the ejection of tray 30 to allow disk 34 to be extracted.

As described above, in the optical disk player according to the present invention, there is provided under the conventional tray a disk supporting member which automatically supports a disk during the loading operation and is automatically spreadable during the unloading operation. Since the disk supporting member operates by the power of the loading motor, which is needed for the forward and backward transfer of the tray, it can be implemented without a separate motor.

According to the optical disk player of the present invention, since a wide receiving space is available for placing a disk on a tray, it is easy for a user to place the disk thereon. Since the position of the received disk is determined while the disk is supported when the tray enters the player, any device disorder due to an erroneous insertion can be prevented.

Although the preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. An optical disk player comprising:
   a tray having arc-shaped guiding slots at a predetermined position on said tray;
   a disk supporting means fixed at a bottom of said tray which is to be spread left and right during a forward transfer of said tray and is to be converged internally during a backward transfer of said tray, said disk supporting means including a disk supporting member, in which said disk supporting member includes arc-shaped disk guiding portions, operating portions and a torsion spring provided inside said operating portions, said disk guiding portions being provided with protrusively formed protrusions on a surface of said disk guiding portions to be inserted into said guiding slots, said operating portions being extended from the rear part of said disk guiding portion and then being bent at a predetermined angle, said disk guiding portions and said operating portions being cross-coupled to each other by screw holes formed in the connection between said disk guiding portions and said operating portions and said torsion spring being coupled to said operating portions;
   a loading means fixedly installed at the bottom of said tray for supplying power needed to transfer said tray forward and backward and for supplying power needed for said disk supporting means to be spread or supported depending on the forward and backward transfer of said tray, said loading means including a transporting gear, a loading motor for supplying power to said transporting gear, a first transmission gear or a belt as a transmission means for transmitting power from said loading motor to said transporting gear, a second transmission gear or a belt as a transmission means for transmitting power from said loading motor to said disk supporting means, and a supporting link operating means for controlling the extending and supporting operations of said disk supporting means, in which said supporting link operating means includes a supporting link operating pulley, a wire inserting boss integrally formed thereon, and a wire inserted into a cut groove of said wire inserting boss; and
   a player main body having a rack gear on a surface adjacent to said tray, in which said rack gear is meshed with said transporting gear during transference of said tray.

2. An optical disk player as claimed in claim 1, wherein said loading means is fixed on a bracket and said bracket is fixed at the bottom of said tray.

3. An optical disk player as claimed in claim 1, wherein both ends of said wire is connected to said disk supporting means.

4. An optical disk player as claimed in claim 1, wherein said disk guiding portions have a curvature radius larger than the curvature radius of said disk.

5. An optical disk player comprising:

a tray having arc-shaped guiding slots at a predetermined position on said tray;

a disk supporting means comprising a disk supporting member including arc-shaped disk guiding portions, operating portions and a torsion spring provided in said operating portions, said disk guiding portions having a curvature radius larger than that of said disk, said disk guiding portions being provided with protrusively formed protrusions on a surface of said disk guiding portions to be inserted into said guiding slots, said operating portions being extended from a rear part of said disk guiding portion and then being bent at a predetermined angle, said disk guiding portions and said operating portions being cross-coupled to each other by screw holes formed in the connection between said disk guiding portions and said operating portions and said torsion spring being coupled to said operating portions, said disk supporting means being fixed to the bottom of said tray in order to be spread left and right during a forward transfer of said tray and to be converged internally during a backward transfer of said tray;

a loading means fixedly installed at the bottom of said tray comprising a transporting gear, a supporting link operating means including a supporting link operating pulley for controlling the spreading and the converging operation of said disk supporting means, a wire inserting boss formed thereon, and a wire inserted into a cut groove of said wire inserting boss and connected to said disk supporting means, and a loading motor for supplying power to both said transporting gear and said disk supporting means which is to be spread or supported depending on the forward or backward transfer of said tray; and a player main body having a rack gear on a surface adjacent to said tray, in which said rack gear is meshed with said transporting gear during transference of said tray.

6. An optical disk player comprising:

a tray having arc-shaped guiding slots at a predetermined position on said tray;

a disk supporting means comprising a disk supporting member including arc-shaped disk guiding portions, operating portions and a torsion spring provided in said operating portions, said disk guiding portions having a curvature radius larger than that of said disk, said disk guiding portions being provided with protrusively formed protrusions on a surface of said disk guiding portions to be inserted into said guiding slots, said operating portions being extended from a rear part of said disk guiding portion and then being bent at a predetermined angle, said disk guiding portions and operating portions being cross-coupled to each other by screw holes formed in the connection between said disk guiding portions and said operating portions and said torsion spring being coupled to said operating portions, said disk supporting means being fixed to the bottom of said tray in order to be spread left and right during a forward transfer of said tray and to be converged internally during a backward transfer of said tray;

a loading means fixedly installed at the bottom of said tray by means of a bracket comprising a transporting gear, a supporting link operating means including a supporting link operating pulley for controlling the spreading and the converging operation of said disk supporting means, a wire inserting boss formed thereon, and a wire inserted into a cut groove of said wire inserting boss and connected to said disk supporting means, and a loading motor for supplying power to both said transporting gear and said disk supporting means which is to be spread or supported depending on the forward or backward transfer of said tray; and a player main body having a rack gear on a surface adjacent to said tray, in which said rack gear is meshed with said transporting gear during transference of said tray.

\* \* \* \* \*